US011593510B1

(12) United States Patent
Knox et al.

(10) Patent No.: US 11,593,510 B1
(45) Date of Patent: Feb. 28, 2023

(54) SYSTEMS AND METHODS FOR SECURELY SHARING AND PROCESSING DATA BETWEEN PARTIES

(71) Applicant: Meta Platforms, Inc., Menlo Park, CA (US)

(72) Inventors: Andrew Knox, Brooklyn, NY (US); Michael Randolph Corey, New York, NY (US); William Patrick Hesch, San Francisco, CA (US); Erik Taubeneck, Brooklyn, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 418 days.

(21) Appl. No.: 16/401,102

(22) Filed: May 1, 2019

(51) Int. Cl.
*G06F 21/62* (2013.01)
*H04L 9/08* (2006.01)

(52) U.S. Cl.
CPC ........ *G06F 21/6245* (2013.01); *H04L 9/0869* (2013.01); *H04L 2209/46* (2013.01)

(58) Field of Classification Search
CPC ............... G06F 21/6245; H04L 9/0869; H04L 2209/46
See application file for complete search history.

(56) References Cited

U.S. PATENT DOCUMENTS

| | | | | |
|---|---|---|---|---|
| 6,820,204 B1 * | 11/2004 | Desai | ................... | G06F 16/256 726/6 |
| 8,209,549 B1 * | 6/2012 | Bain, III | ............. | G06F 21/6245 713/193 |
| 9,875,243 B2 * | 1/2018 | Veugen | ............... | G06F 21/6254 |
| 10,846,564 B2 | 11/2020 | Liu et al. | | |
| 2009/0247193 A1 * | 10/2009 | Kalavade | ................ | H04L 67/18 455/456.3 |

(Continued)

FOREIGN PATENT DOCUMENTS

| | | |
|---|---|---|
| EP | 3716110 A1 | 9/2020 |
| EP | 3716111 A1 | 9/2020 |

OTHER PUBLICATIONS

Amarasekara et al. "Security and privacy management in cross-domain tracking systems within an e-marketing context." 2019 IEEE Asia-Pacific Conference on Computer Science and Data Engineering (CSDE). 2019. p. 1-6. (Year: 2019).*

*Primary Examiner* — Carl G Colin
*Assistant Examiner* — Zhe Liu
(74) *Attorney, Agent, or Firm* — Sheppard Mullin Richter & Hampton LLP

(57) ABSTRACT

Systems, methods, and non-transitory computer-readable media can determine a first dataset provided by a first party, wherein the first dataset includes a set of vectors that are each associated with a user identifier. A second dataset provided by a second party can be determined, wherein the second dataset includes a set of vectors that are each associated with a user identifier. One or more vectors in the first dataset can be matched to vectors in the second dataset based on a secure multi-party computation without revealing respective graph information of the first party or the second party. Respective mappings between vectors in the first dataset to a set of shared universal identifiers can be provided to the first party. Respective mappings between vectors in the second dataset to the set of shared universal identifiers can be provided to the second party.

20 Claims, 11 Drawing Sheets

(56) References Cited

U.S. PATENT DOCUMENTS

| | | | | |
|---|---|---|---|---|
| 2012/0059809 A1* | 3/2012 | Furman | G06Q 30/02 | 707/705 |
| 2012/0158954 A1* | 6/2012 | Heffernan | G06Q 30/0246 | 709/224 |
| 2013/0124333 A1* | 5/2013 | Doughty | G06Q 30/0261 | 705/14.66 |
| 2014/0012862 A1* | 1/2014 | Kawamoto | G06F 16/245 | 707/750 |
| 2015/0071427 A1* | 3/2015 | Kelley | G06Q 30/0201 | 379/265.09 |
| 2015/0332064 A1* | 11/2015 | Camenisch | H04L 63/0421 | 713/164 |
| 2015/0332316 A1* | 11/2015 | Cohen Kassko | G06Q 30/0255 | 705/14.45 |
| 2016/0012252 A1* | 1/2016 | Deleeuw | G09C 1/00 | 726/26 |
| 2016/0140587 A1* | 5/2016 | Wilson | G06F 16/2291 | 705/7.33 |
| 2017/0039242 A1* | 2/2017 | Milton | H04W 4/02 | |
| 2017/0068987 A1* | 3/2017 | Levinson | G06Q 30/0275 | |
| 2017/0083916 A1* | 3/2017 | Fad | G06Q 20/4014 | |
| 2017/0213239 A1* | 7/2017 | Leach | G06Q 50/01 | |
| 2019/0205698 A1 | 7/2019 | Liu et al. | | |
| 2019/0251585 A1 | 8/2019 | Milton et al. | | |
| 2019/0259041 A1 | 8/2019 | Jackson | | |
| 2020/0005181 A1 | 1/2020 | Agarwal et al. | | |
| 2020/0089786 A1 | 3/2020 | Cheng et al. | | |
| 2020/0228604 A1* | 7/2020 | Wang | H04L 67/14 | |
| 2020/0294069 A1* | 9/2020 | Sheppard | G06F 7/544 | |
| 2020/0311143 A1* | 10/2020 | Wang | G06F 16/9038 | |
| 2020/0311297 A1* | 10/2020 | Langseth | G06F 21/6245 | |
| 2020/0320100 A1* | 10/2020 | Piecko | G06F 16/284 | |
| 2021/0279507 A1 | 9/2021 | Liu et al. | | |

\* cited by examiner

SYSTEMS AND METHODS FOR SECURELY SHARING AND PROCESSING DATA BETWEEN PARTIES

FIELD OF THE INVENTION

The present technology relates to the field of multi-party computations, More particularly, the present technology relates to techniques for securely performing multi-party computations,

BACKGROUND

Today, entities can maintain sensitive data that is not intended for access by others. For example, sensitive data may include personally identifiable information (PII), such as user IDs, names, phone numbers, e-mails, or the like. In some instances, entities may want to collaborate with one another to gain various insights. Such collaboration can require the entities to reveal some of their sensitive data to one another. For example, the entities may perform a lift analysis to measure the effectiveness of an electronic advertising campaign in a platform. In this example, the lift analysis can be performed by joining some portion of each entity's sensitive data. Under conventional approaches, to prevent sensitive data from unauthorized access, the entities will typically rely on a trusted third party to facilitate the collaboration. For example, the entities can provide their respective sensitive data to the trusted third party who then joins the sensitive data and performs the lift analysis. The trusted third party can then provide results of their lift analysis to one or both entities.

SUMMARY

Various embodiments of the present technology can include systems, methods, and non-transitory computer readable media configured to determine a first dataset provided by a first party, wherein the first dataset includes a set of vectors that are each associated with a user identifier. A second dataset provided by a second party can be determined, wherein the second dataset includes a set of vectors that are each associated with a user identifier, One or more vectors in the first dataset can be matched to vectors in the second dataset based on a secure mufti-party computation without revealing respective graph information of the first party or the second party. Respective mappings between vectors in the first dataset to a set of shared universal identifiers can be provided to the first party. Respective mappings between vectors in the second dataset to the set of shared universal identifiers can be provided to the second party.

In an embodiment, a vector in the first dataset matches a vector in the set dataset, wherein both vectors are mapped to a same shared universal identifier.

In an embodiment, the shared universal identifier corresponds to a join-key for joining the vector in the first dataset with the vector in the second dataset.

In an embodiment, a vector in the first dataset that is unmatched is mapped to a shared universal identifier, and wherein the mapping to the shared universal identifier is provided only to the first party.

In an embodiment, a vector in the second dataset that is unmatched is mapped to a shared universal identifier, and wherein the mapping to the shared universal identifier is provided only to the second party.

In an embodiment, the set of shared universal identifiers includes one or more padding vectors to which no vectors in the first dataset and the second dataset are mapped.

In an embodiment, each vector includes a set of attributes corresponding to personally identifiable information.

In an embodiment, an ordering of the set of attributes for vectors in the first dataset and vectors in the second dataset is pre-defined, In an embodiment, the one or more vectors in the first dataset are matched to vectors in the second dataset based on the set of attributes corresponding to personally identifiable information, In an embodiment, the mappings between vectors in the first dataset to the set of shared universal identifiers and the mappings between vectors in the second dataset to the set of shared universal identifiers are used to perform a lift analysis for a randomized control trial.

Various embodiments of the present technology can include systems, methods, and non-transitory computer readable media configured to determine a set of mappings between vectors in a first dataset associated with a first party to a set of shared universal identifiers based on a secure multi-party computation. A set of mappings can be determined between vectors in a second dataset associated with a second party to the set of shared universal identifiers based on the secure multi-party computation. Membership information for each vector in the first dataset can be obtained. The membership information indicating whether an individual associated with the vector is assigned to a test group, a control group, or neither. Conversion information for each vector in the second dataset can be obtained. The conversion information indicating whether an individual converted. Conversion counts for the test group and the control group can be determined based at least in part on the membership information and the conversion information.

In an embodiment, the systems, methods, and non-transitory computer readable media are configured to determining that a length of a vector in the first dataset has a different length than a vector in the second dataset and aborting the determining of conversion counts for the test group and the control group based on the different length.

In an embodiment, the systems, methods, and non-transitory computer readable media are configured to determining that an individual referenced by a vector in the first dataset is included in the test group; determining that the individual converted based on a vector referencing the individual in the second dataset; incrementing a count of individuals in the test group; and incrementing a count of conversions by individuals in the test group.

In an embodiment, the systems, methods, and non-transitory computer readable media are configured to determining that an individual referenced by a vector in the first dataset is included in the control group; determining that the individual converted based on a vector referencing the individual in the second dataset; incrementing a count of individuals in the control group; and incrementing a count of conversions by individuals in the control group.

In an embodiment, the systems, methods, and non-transitory computer readable media are configured to provide information describing a count of individuals in the test group and a count of conversions in the test group to the first party.

In an embodiment, the systems, methods, and non-transitory computer readable media are configured to provide information describing a count of individuals in the control group and a count of conversions in the control group to the first party.

In an embodiment, the first party is not provided conversion information identifying individuals who converted.

In an embodiment, the second party is not provided membership information indicating whether individuals were in the test group, the control group, or neither group.

In an embodiment, the systems, methods, and non-transitory computer readable media are configured to abort the determining of conversion counts when a count of individuals in the test group does not satisfy a minimum membership threshold.

In an embodiment, the systems, methods, and non-transitory computer readable media are configured to abort the determining of conversion counts when a count of individuals in the control group does not satisfy a minimum membership threshold.

Figure 1:
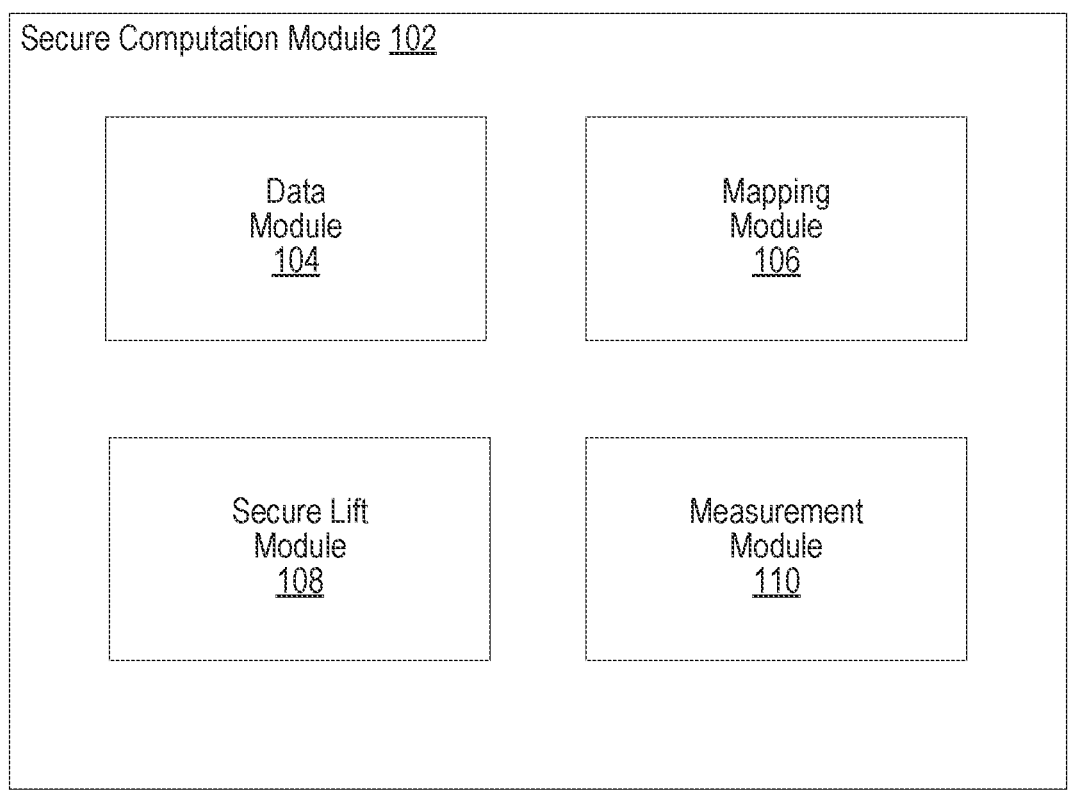
FIG. 1 illustrates an example secure computation module, according to an embodiment of the present technology.
Figure 1:
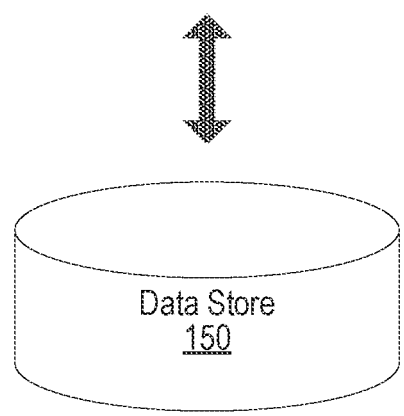

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Securely Sharing and Processing Data Between Parties

Today, entities can maintain sensitive data that is not intended for access by others. For example, sensitive data may include personally identifiable information (PII), such as user IDs, names, phone numbers, e-mails, or the like. In some instances, entities may want to collaborate with one another to gain various insights. Such collaboration can require the entities to reveal some of their sensitive data to one another. For example, the entities may perform a lift analysis to measure the effectiveness of an electronic advertising campaign in a platform. In this example, the lift analysis can be performed by joining some portion of each entity's sensitive data. Under conventional approaches, to prevent sensitive data from unauthorized access, the entities will typically rely on a trusted third party to facilitate the collaboration. For example, the entities can provide their respective sensitive data to the trusted third party who then joins the sensitive data and performs the lift analysis. The trusted third party can then provide results of their lift analysis to one or both entities. However, relying on a trusted third party for such collaboration comes with drawbacks. For example, despite being "trusted", the entities' cannot be certain that the third party will maintain secrecy of their sensitive data. Further, the entities also cannot be certain the trusted third party will manage their sensitive data in accordance with their data retention policies. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. For example, a first party and second party may work in collaboration to analyze their respective datasets. In some instances, each party's dataset may contain sensitive data that should not be revealed to the other party. In various embodiments, rather than relying on a trusted third party to facilitate the collaboration, a secure multi-party computation (secure MPC) can be used to jointly perform various analyses using the first and second party's datasets all while keeping those datasets private from the other party. Under this improved approach, the parties can jointly perform analyses without needing a trusted third party to facilitate the computation. Without a trusted third party, neither party needs to be concerned about potential abuse, leaking, or unauthorized retention of their sensitive data which would typically be provided to a third party under conventional approaches. In various embodiments, the improved approach can be applied to determine mappings between the first party's dataset and the second party's dataset. For example, the first party's dataset may include a first set of vectors and the second party's dataset may include a second set of vectors. Each party's vector can correspond to an item (or record) of data and include a unique identifier and a set of pre-defined attributes (e.g., name, email address, phone number, etc.) that are known only to that party. In various embodiments, vectors in the first party's dataset can be mapped to a set of shared universal identifiers (UIDs) based on a mapping scheme. Similarly, vectors in the second party's dataset can also be mapped to the set of shared universal identifiers based on the mapping scheme. Based on the mapping scheme, a vector can be mapped to a shared universal identifier based on attributes included in the vector. For example, a vector from the first party's dataset may include a unique identifier "532" and attributes "(555) 555-5555" and "example@example.com." In this example, the vector from the first party's dataset may be mapped to a universal identifier "U03". Similarly, a vector from the second party's dataset may include a unique identifier "A664" and attributes "(555) 555-5555" and "example@example.com." Based on the mapping scheme, the vector from the second party's dataset can be mapped to the same universal identifier "U03" since attributes included in the vector from the second party's dataset match attributes included in the vector from the first party's dataset. In various embodiments, the mappings between the first party's dataset and the second party's dataset can be used to securely perform additional computations (or analyses). For example, in some embodiments, the mappings can be used to securely perform reach and frequency measurements. In some embodiments, the mappings can be used to securely perform a lift analysis to measure the effectiveness of an electronic advertising campaign across publishers and platforms without revealing confidential details about each party's data to the other party or third parties. More details describing the disclosed technology are provided below.

FIG. 1 illustrates an example system 100 including a secure computation module 102, according to an embodiment of the present technology. The secure computation module 102 can be configured to allow two or more parties to jointly and securely compute functions (or operations) based on their respective datasets without revealing those datasets to one another. For example, in various embodiments, the secure computation module 102 can compute such functions as secure multi-party computations (or secure MPCs). In various embodiments, each party involved in the secure multi-party computation can separately operate its own computing system, such as the example system 100. In such embodiments, each party's data remains stored in respective data stores that are accessible only to that party's computing system. When performing a secure multi-party computation, each party's computing system can communicate its respective data (or relevant portions of data) to the other party's computing system based on a secret share mechanism. The computing systems can then work in concert to jointly compute the functions (or operations), as illustrated in the examples of FIGS. 3A-3B and FIGS. 5A-5C. As shown in the example of FIG. 1, the secure computation module 102 may include a data module 104, a mapping module 106, a secure lift module 108, and a measurement module 110. In some instances, the example system 100 can include at least one data store 150. The components (e.g., modules, elements, etc.) shown in this figure and all figures herein are exemplary only, and other implementations may include additional, fewer, integrated, or different components. Some components may not be shown so as not to obscure relevant details.

In some embodiments, the secure computation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the secure computation module 102 can be, in part or in whole, implemented as software running on one or more computing devices or systems, such as on a server system or a client computing device. In some instances, the secure computation module 102 can be, in part or in whole, implemented within or configured to operate in conjunction with or be integrated with a social networking system (or service), such as a social networking system 730 of FIG. 7. Likewise, in some instances, the secure computation module 102 can be, in part or in whole, implemented within or configured to operate in conjunction with or be integrated with a client computing device, such as the user device 710 of FIG. 7. For example, the secure computation module 102 can be implemented as or within a dedicated application (e.g., app), a program, or an applet running on a user computing device or client computing system. The application incorporating or implementing instructions for performing some, or all, functionality of the secure computation module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The secure computation module 102 can be configured to communicate and/or operate with the at least one data store 150, as shown in the example system 100. The at least one data store 150 can be configured to store and maintain various types of data relevant to the secure computation module 102. In some implementations, the at least one data store 150 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 150 can store information associated with users, such as user identifiers, user information, profile information, user specified settings, content produced or posted by users, and various other types of user data.

The data module 104 can be configured to securely receive data from parties that seeks to jointly compute functions (or operations) based on their respective datasets. In various embodiments, the data module 104 can receive data from other parties based on a conventional secret share mechanism. For example, the data module 104 may be implemented in a computing system operated by a first party that seeks to perform a secure multi-party computation with a second party based on their respective datasets. In this example, the data module 104 can access datasets associated with the first party from one or more data stores accessible to the computing system operated by the first party. The data module 104 can also access datasets provided by the second party based on a conventional secret share mechanism. Many variations are possible.

The mapping module 106 can be configured to determine a mapping between data associated with a first party and data associated with a second party. For example, the first party's data may include a first set of vectors and the second party's data may include a second set of vectors. Each vector can correspond to an item of data and include a unique identifier (e.g., user identifier) and pre-defined attributes (e.g., name, email address, phone number, etc.) that are known only to that party. In various embodiments, the mapping module 106 can map vectors in the first party's data to a set of shared universal identifiers based on a mapping scheme. Based on the mapping scheme, vectors that include matching pre-defined attributes (e.g., name, email address, phone number, etc.) can be mapped to the same shared universal identifier. Similarly, the mapping module 106 can map vectors in the second party's data to the set of shared universal identifiers based on the mapping scheme. Each party can privately be provided the mappings between its vectors to the shared universal identifiers. In various embodiments, the mappings between the first party's data and the second party's data can be used to securely perform additional operations (or computations), as described below. More details regarding the mapping module 106 will be provided below with reference to FIG. 2.

The secure lift module 108 can be configured to securely perform lift analyses based on mappings determined by the mapping module 106. In some embodiments, the secure lift module 108 can perform a lift analysis as a secure multi-party computation involving identity providers (or parties). For example, a first party, Alice, may be conducting an experiment, such as a randomized control trial. Alice is aware of which persons are in a test group, a control group, and who was not included in the experiment. A second party, Bob, can be an outcome observer. For example, Bob can observe which persons make a conversion based on information included in Bob's dataset. For example, Alice may target electronic advertisements to users in the test group through a computing platform that is managed by Bob. Here; Bob is able to determine whether a given user converted in response to an electronic advertisement. In this example, the secure lift module 108 can perform a lift analysis to calculate the number of people who convert within the test and control groups. When performing the lift analysis, the secure lift module 108 can maintain a set of security constraints to ensure that Alice's sensitive data is not revealed to Bob and Bob's sensitive data is not revealed to Alice. The set of security constraints include: (1) Alice cannot learn which individuals converted, (2) Bob cannot learn any individual's membership in the test, control, or excluded groups, and (3) the lift analysis is aborted if any converter group does not meet a minimum membership threshold. To perform the lift analysis, the secure lift module 108 can access mappings determined for vectors in Alice's dataset and vectors in Bob's dataset. In some embodiments, each party generates vectors for every mapped entry and provides them to the secure lift module 108. For example, Alice can generate vectors as ($a_{join\_key\_i}$, $tc_i$), where $tc_i$ is 1 if the person is in the test group, 0 if in the control group, or −1 if not in the test or the join key refers to an unmatched identifier. Similarly, Bob can generate vectors as ($b_{join\_key\_i}$, $conversion_i$), where $conversion_i$ is 1 if the person converted and 0 if not. In some embodiments, both Alice and Bob can presort by join key to optimize the lift analysis. The secure lift module 108 can then instantiate four variables: test_count, control_count, test_converters_count, and control_converters_count. For each pair of vectors ($a_{join\_key\_i}$; $tc_i$) and ($b_{join\_key\_i}$, $conversion_i$), the secure lift module 108 operates as follows:

1. If $a_{join\_key\_i}$ does not equal $b_{join\_key\_i}$, the secure lift module 108 aborts the lift analysis because there is an error in the input provided by the parties (e.g., input is not of the same length or ordering).
2. If $tc_i$=1, the secure lift module 108 increments test_count by 1.
   a. If $tc_i$=1 and $conversion_i$=1, the secure lift module 108 increments test_converter_count by 1.
3. Else if $tc_i$=0, the secure lift module 108 increments control_count by 1.
   a. If $tc_i$=0 and $conversion_i$=1, the secure lift module 108 increments control_converter_count by 1

At completion, if test_converter_count or control_converter_count are below predefined thresholds, the secure lift module 108 aborts the lift analysis. Otherwise, the secure lift module 108 reveals values assigned to the variables test_count, control_count, test_converters_count, and control_converters_count to Alice.

The measurement module 110 can be configured to securely perform reach and frequency measurements based on data mappings determined by the mapping module 106. For example, each identity provider can provide frequency per secure identity provider person-ID (SID) to the measurement module 110 along with their respective portion of an encryption key (e.g., a random integer). The measurement module 110 can decrypt the SIDs using the encryption key. The measurement module 110 can also compute a secure cross channel person-ID (SCID), a sum frequency per SCID, and the unique SCIDs with frequency greater than zero (unique reach), to name some examples. Many variations are possible.

Figure 2:
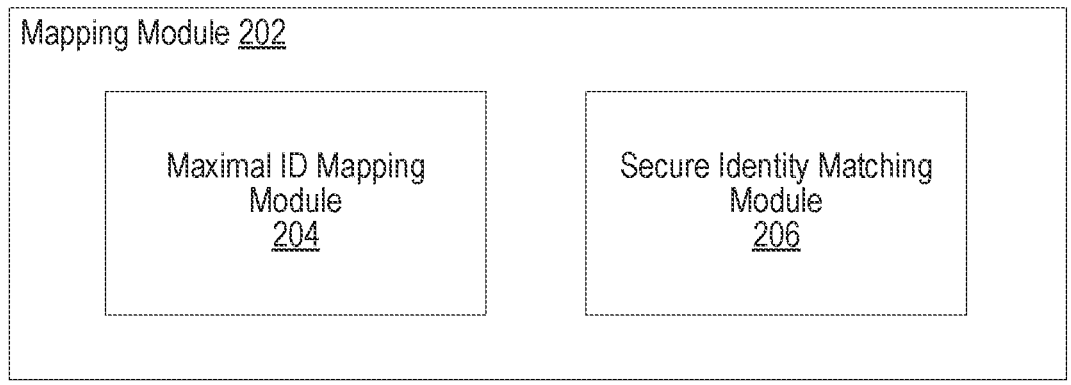
FIG. 2 illustrates an example mapping module, according to an embodiment of the present technology.

FIG. 2 illustrates an example mapping module 202, according to an embodiment of the present technology. As mentioned, in various embodiments, the mapping module 202 can be configured to determine a mapping between data associated with a first party and data associated with a second party. In some embodiments, the mapping can be used to join the first and second party's data. For example, the mapping module 202 can map vectors in the first party's data to a set of shared universal identifiers (UIDs) based on a mapping scheme. Similarly, the mapping module 106 can map vectors in the second party's data to the set of shared universal identifiers based on the mapping scheme. Each party can privately maintain the mappings between its vectors to shared universal identifiers. The parties can reuse the mappings as needed to securely perform various multi-party computations. As shown in the example of FIG. 2, the mapping module 202 can include a maximal ID mapping module 204 and a secure identity matching module 206. The maximal ID mapping module 204 and the secure identity matching module 206 each provide a different mapping scheme for mapping party data to shared universal identifiers without exposing sensitive data. Generally, the maximal ID mapping module 204 and the secure identity matching module 206 can generate ordered mappings for each party without revealing that party's sensitive data and mapping information to another party. As a result, the maximal ID mapping module 204 and the secure identity matching module 206 can provide the benefits of a trusted third party without actually requiring the trusted third party. For example, mapping information determined by the maximal ID mapping module 204 and the secure identity matching module 206 can prevent parties from learning about (1) a number of matched data, (2) whether a particular item is matched, or (3) sensitive data of a given party.

The maximal ID mapping module 204 provides an example mapping scheme for mapping party data to shared universal identifiers without exposing sensitive data. For example, assume that a first party, Alice, and a second party, Bob, each have distinct datasets. Each dataset can include a set of items (or records) that are each associated with a unique identifier (e.g., user identifier). In this example, Alice and Bob can map their respective user identifiers to a set of shared universal identifiers (UIDs). The mapping can, therefore, serve as a join key between the two datasets. When mapping their data to shared universal identifiers, each party can declare an upper bound on the number of identifiers (e.g., user identifiers) they want to provide for mapping. The upper bound declared by each party need not be identical and can vary depending on the party. The maximal ID mapping module 204 can then perform a matching process that determines a mapping for each party's data to a shared universal identifier. In various embodiments, the maximal ID mapping module 204 performs the matching process as a secure multi-party computation. Other implementations are possible. For instance, such operations can be performed using any "secure" environment including using trusted third parties. In some embodiments, the maximal ID mapping module 204 implements a set of mapping rules by which user identifiers are mapped to shared universal identifiers. The matching rules include the following rules. (1) If an item in a first party's dataset and an item in a second party's dataset match on unique data, the maximal ID mapping module 204 will map user identifiers associated with the items to the same shared universal identifier. (2) If an item in a party's dataset is unmatched, the maximal ID mapping module 204 maps the item to a shared universal identifier and provides the mapping to only that party. (3) If any items are matched, the maximal ID module 204 will ensure that the number of universal identifiers is greater than the number of items provided by all parties. For example, in some embodiments, the maximal ID module 204 pads the set of universal identifiers with "fake" identifiers (or padding vectors). (4) The ordering of matched, unmatched, or fake identifiers in the universal identifiers should not convey information about the match. The order should be random or based on something truly independent of the match.

For example, each item in Alice's dataset can be expressed as a vector $v=(v_1, v_2, v_3, \ldots, v_n)$. The vector can be constructed such that $v_1$ is a unique, but random, identifier (e.g., a user identifier) known only to Alice. The remaining vector values $(v_2, v_3, \ldots, v_n)$ can be pre-agreed upon attributes that can be used to match items. In some embodiments, the ordering of these attributes can be agreed upon in advance in ascending or descending order of importance to facilitate secure matching. For example, the attributes may reference personally identifiable information (PII), such as an e-mail address, phone number, and birthdate, to name some examples. Each item in Bob's dataset can be expressed similarly. For each item in Alice's set, the maximal ID mapping module 204 can create a new mapping vector $(v_{i, Alice}, r(\ ), r(\ ))$, where $v_{i, Alice}$ corresponds to a vector in Alice's dataset and where each $r(\ )$ denotes a randomly generated value. The mapping vector can be used to manage mapping information for a given vector in Alice's dataset. The randomly generated value can be produced, for example, by a generally known random value generator that produces a random element within a field p. Each new use of the random generator produces a new randomly generated value. The maximal ID mapping module 204 can begin matching each vector in Alice's dataset with vectors in Bob's data. For example, the maximal ID mapping module 204 can iterate through a first attribute in each of Bob's vectors. If there is a match between a vector in Alice's dataset (e.g., $v_{i, Alice}$) and a vector in Bob's dataset (e.g., $v_{j, Bob}$) based on the first attribute, the maximal ID mapping module 204 updates a mapping vector associated with the vector in Alice's dataset with the matching vector in Bob's dataset (e.g., $v_{j, Bob}$). For example, the maximal ID mapping module 204 can update a second value in the mapping vector (e.g., $r(\ )$) with the matching vector in Bob's dataset (e.g., $v_{j, Bob}$). The updated mapping vector can be represented as $(v_{i, Alice}, v_{j, Bob}, r(\ ))$. The third value in the mapping vector can be used as a join key for the matching vectors $v_{i, Alice}$ and $v_{j, Bob}$. If no match is found based on the first attribute, the maximal ID mapping module 204 can continue attempting to match vectors by iterating through additional attributes in each of Bob's vectors and updating corresponding mapping vectors, as described above. If no matching vector is found for a vector in Alice's dataset, then that vector's mapping vector remains as $(v_{i, Alice}, r(\ ), r(\ )$. For any remaining unmatched vectors in Bob's dataset, the maximal ID mapping module 204 also generates a corresponding vector as $(r(\ ), v_{j, Bob}, r(\ ))$. In various embodiments, the maximal ID mapping module 204 generates padding vectors to ensure compliance with the security constraints, provided above. For example, if there are k matches, the maximal ID mapping module 204 can generate k new vectors of the form $(r(\ ), r(\ ), r(\ ))$. The maximal ID mapping module 204 can also shuffle Alice's vectors so that the position does not reveal information about matches to Bob's vectors. The maximal ID mapping module 204 then outputs a list of shuffled vectors, each having one of the following forms:

$(v_{i, Alice}, v_{j, Bob}, r(\ ))$, if a match exists between a vector $v_{i, Alice}$ in Alice's dataset and a vector $v_{j, Bob}$ in Bob's dataset, $(v_{i, Alice}, r(\ ), r(\ ))$, if no match was found for a vector $v_{i, Alice}$ in Alice's dataset, $(r(\ ), v_{j, Bob}, r(\ ))$, if no match was found for a vector $v_{j, Bob}$ in Bob's dataset, and $(r(\ ), r(\ ), r(\ ))$, which represents a padding vector.

Once matching is complete, the maximal ID module 204 can provide each party with mapping information indicating mappings between their user identifiers and shared universal identifiers. The parties can reuse such mappings as needed to securely perform various analyses as secure multi-party computations, as described above.

The secure identity matching module 206 provides another example mapping scheme for mapping party data to shared universal identifiers without exposing sensitive data. The secure identity matching module 206 can extend the mapping scheme provided by the maximal ID mapping module 204 to allow for one-to-one, one-to-many, and many-to-many relationships between users (e.g., user identifiers) represented in datasets from different identity providers (or parties). For example, such mappings may be needed when a first party thinks two devices belong to two different users but a second party believes the two devices belong to the same user. In various embodiments, the secure identity matching module 206 can operate while maintaining the security constraints described above. In general, the secure identity matching module 206 can implement the mapping scheme using generally known techniques for performing secure multi-party computations and SSE. For example, each item in a first identity provider's (e.g., Alice's) dataset and a second identity provider's (e.g., Bob's) dataset can be expressed as an identity provider person (IPP). For example, an identity provider person can be represented as a set (or collection) of personally identifiable attributes (e.g., name, phone number, email address, etc.) which constitute an identity provider's view of a single user. The identity provider person can be identified by a unique identifier (e.g., user identifier) known only to the identity provider that provided information describing the identity provider person. In some embodiments, the secure identity matching module 206 can determine one-to-one mappings between identity provider persons and a secure identity provider person-ID (SID). In some embodiments, a SID is a one-to-one mapping to a unique identifier corresponding to an identity provider person. In such embodiments, Alice can be provided SIDs corresponding to unique identifiers referenced in Alice's dataset while Bob can be provided SIDs corresponding to unique identifiers referenced in Bob's dataset. In various embodiments, the secure identity matching module 206 can perform a specified matching process, which allows for one-to-one, many-to-one, and many-to-many joins between identity provider persons in Alice's dataset and Bob's dataset. The secure identity matching module 206 specifies a join-key which corresponds to a secure cross channel person-ID (SCID). In some embodiments, the SCID can act as a join-key between SIDs corresponding to Alice's dataset and SIDs corresponding to Bob's dataset. The secure identity matching module 206 can multiply the SCID by n, where n corresponds to a number of identity provider persons that can correspond to a secure cross channel person. For example, a secure cross channel person may be defined as consisting of a maximum of 100 identity provider persons. In this example, the SCID can be multiplied by 100. Next, the secure identity matching module 206 can increment a first SID by 1 from the SCID value while the remaining SIDs are incremented by 1 from the previous SID until all matched persons are exhausted. The process repeats for each match. In some embodiments, the secure identity matching module 206 encrypts the SCID to ensure that sensitive data is not revealed based on the mappings. For example, when encrypting the SCID, both identity providers can submit a random integer to the secure identity matching module 206. The secure identity matching module 206 can add the integers to produce an encryption key. The identity providers can also individually retain their random integers which can be used to reconstruct the encryption key in the future. Thus, the secure identity matching module 206 can discard the encryption key when no longer needed but can also regenerate the encryption key when the identity providers provide the random integers for performing another computation or measurement with their SIDs. The secure identity matching module 206 can output match information based on the matching process. For example, Alice's dataset may include an identity provider person P who Alice believes is associated with a particular laptop, phone, and tablet. Bob's dataset may also include the identity provider person P who Bob believes is associated the particular laptop, phone, and a desktop. Bob is also aware of an identity provider person N who is associated with the tablet which Alice believes is associated with the identity provider person P. In other words, Alice is aware that the identity provider person P has a tablet but is not aware of the desktop while Bob is aware that the identity provider person P has a desktop but is not aware that the tablet is also associated with the identity provider person P. Both Alice and Bob can provide their data to the secure identity matching module 206. The secure identity matching module 206 can determine that the identity provider person P is associated with a laptop, phone, tablet, and desktop based on the data provided by Alice and Bob. In this example, the secure identity matching module 206 is aware of three views: a first view where P is associated with the laptop, phone, and tablet (Alice's view); a second view where P is associated with the laptop, phone, and desktop (Bob's view); and a third view where N is associated with the tablet (Bob's view). In this example, the secure identity matching module 206 can assign the identity provider person P with a cross publisher ID 27318. To prevent Bob from learning details about Alice's device graph, the secure identity matching module 206 can assign different versions of the cross publisher ID to each view. For example, the first view can be assigned 27318v1, the second view can be assigned 27318v2, and the third view can be assigned 27318v3. The secure identity matching module 206 can encrypt each version of the cross publisher ID using an encryption key, as described above. Each identity provider can be provided with one SCID for every unique identifier they provide to the secure identity matching module 206. In this example, the secure identity matching module 206 can provide Alice with an SCID corresponding to the identity provider person P based on Alice's view. Further, the secure identity matching module 206 can provide Bob with an SCID corresponding to the identity provider person P based on Bob's view and an SCID corresponding to the identity provider person N based on Bob's view. As a result, neither Alice nor Bob can gain insights about identity provider persons based on the mappings. In general, SCIDs and their mappings are known only to the secure identity matching module 206. In some embodiments, the mappings are not retained and can be computed by the secure identity matching module 206 on demand. Many variations are possible. For example, in some embodiments, rather than relying on both an SCID and SID, each secure cross channel person is assigned a single SCID, and for each identity provider person, that SCID is encrypted with a unique (and random) nonce. This provides the same property that the encrypted SCID is unique for each identity provider person. In the foregoing example, rather than assigning the first view 27318v1, the second view 27318v2, and the third view 27318v3, all three views are assigned 27318 and are each encrypted with distinct and random nonces.

Figure 3A:
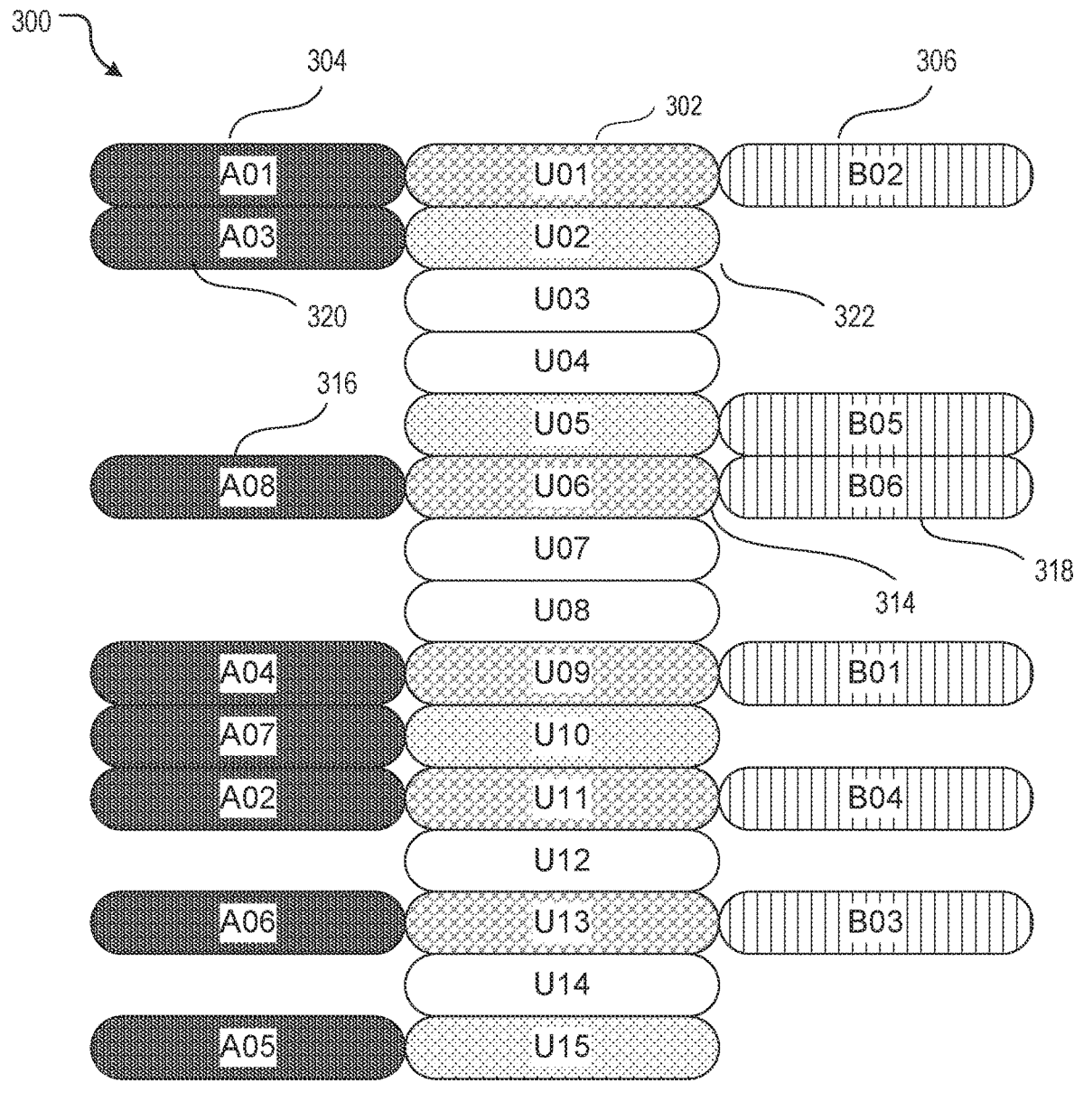
FIGS. 3A-B illustrate examples of secure identity mapping, according to an embodiment of the present technology.

FIG. 3A illustrates an example secure identity mapping 300 generated as a result of securely matching identities based on the maximal ID mapping module 204, according to an embodiment of the present technology. The example secure identity map 300 illustrates a mapping that may partially be provided to parties. In the example of FIG. 3A, the mapping 300 includes shared universal identifiers 302 to which vectors 304 provided by a first party and vectors 306 provided by a second party are mapped. For example, according to the mapping 300, a vector 316 including an identifier A08 provided by the first party is mapped to a shared universal identifier U06 314. Similarly, a vector 318 including an identifier B06 provided by the second party is also mapped to the shared universal identifier U06 314. This mapping permits the first and second parties to securely compute operations, such as reach and frequency measurements, without revealing their sensitive data, as described above. The mapping 300 also includes instances where vectors provided by the first party did not map to any vectors provided by the second party. For example, a vector 320 including an identifier A03 is shown as being mapped to shared universal identifier U02 322 without any matching vector from the second party's dataset. In some embodiments, the first party is provided only mappings from its vectors 304 to the shared universal identifiers 302 while the second party is provided only mappings from its vectors 306 to the shared universal identifiers 302. Many variations are possible.

Figure 3B:
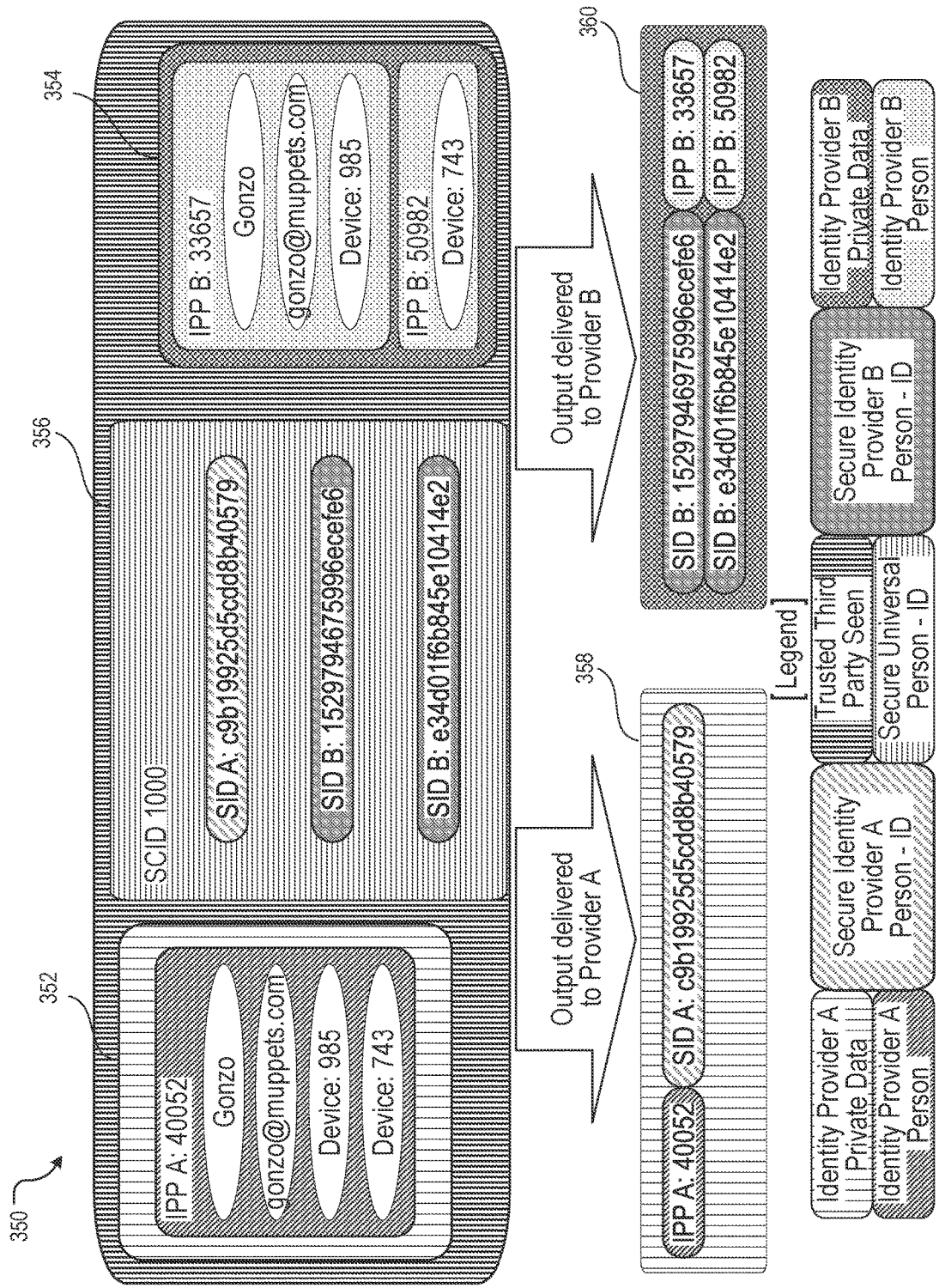

FIG. 3B illustrates another example security identity mapping 350 generated as a result of securely matching identities based on the secure identity matching module 206, according to an embodiment of the present technology. The example illustrates a secure multi-party computation being performed based on a dataset 352 associated with a Provider A and a dataset 354 associated with a Provider B. A Secure Universal Person ID (SCID) 356 can be determined from the datasets 352 and 354, as described above in reference to the secure identity matching module 206. For example, the SCID 356 includes a Secure Identity Provider ID (SID) A that corresponds to an Identity Provider Person A (IPP A: 40052) reflected in the dataset 352. The SCID 356 also includes two instances of a Secure Identity Provider ID (SID) B that each correspond to an Identity Provider Person B (IPP B: 33657 and IPP B: 50982) reflected in the dataset 354. Individual results of the secure multi-party computation can separately be provided to Provider A and Provider B, As shown, an output 358 is provided to Provider A (or a computing system of Provider A) while a separate output 360 is provided to Provider B (or a computing system of Provider B). The outputs 358 and 360 include respective information matching Identity Provider Persons to SID, as shown in FIG. 3B.

Figure 4:
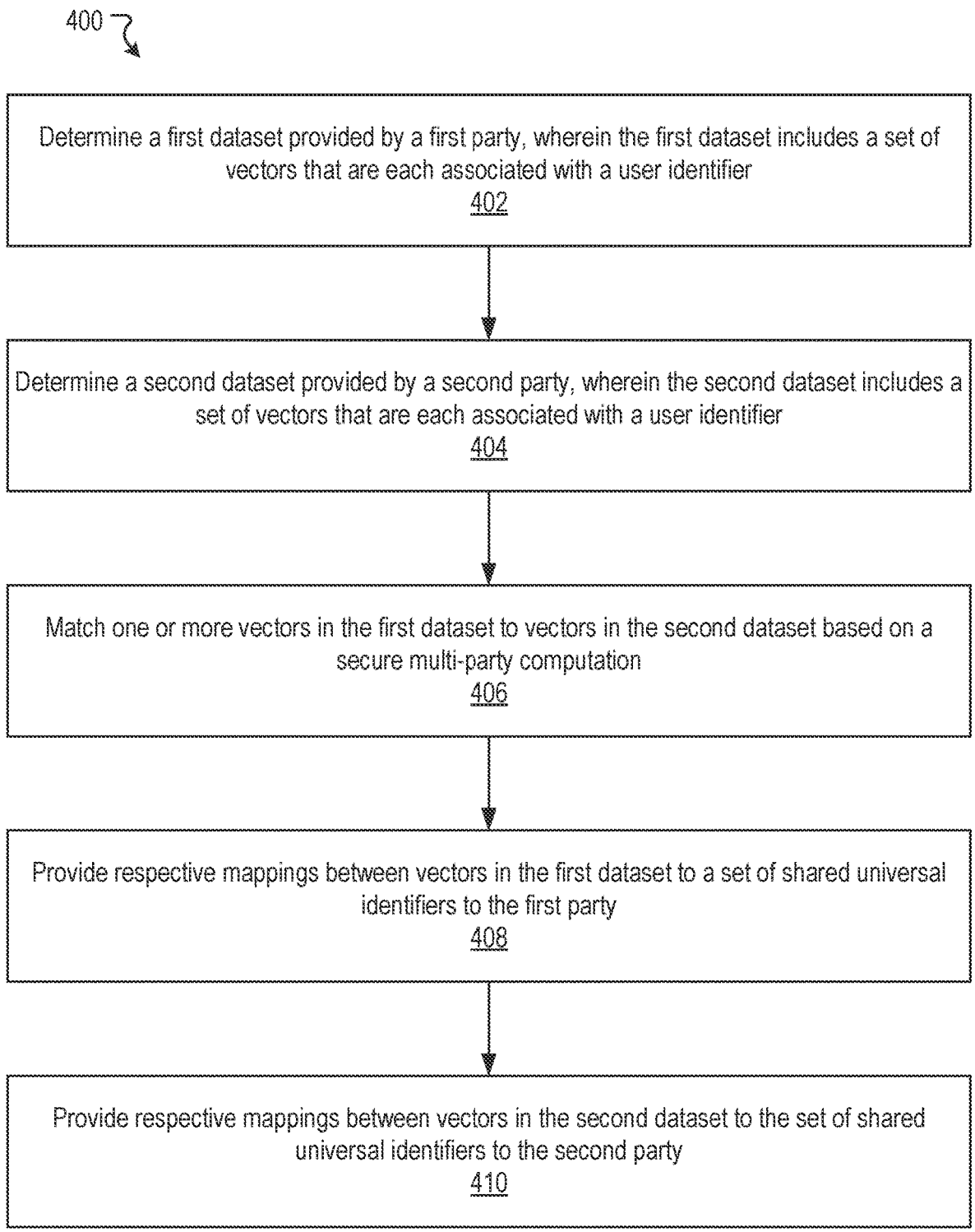
FIG. 4 illustrates an example method for matching identities securely, according to an embodiment of the present technology.

FIG. 4 illustrates an example method 400 for matching identities securely, according to an embodiment of the present technology. It should be appreciated that there can be additional, fewer, or alternative steps performed in similar or alternative orders, or in parallel, within the scope of the various embodiments discussed herein unless otherwise stated.

At block 402, a first dataset provided by a first party is determined, wherein the first dataset includes a set of vectors that are each associated with a user identifier. At block 404, a second dataset provided by a second party is determined, wherein the second dataset includes a set of vectors that are each associated with a user identifier. At block 406, one or more vectors in the first dataset are matched to vectors in the second dataset based on a secure multi-party computation. At block 408, respective mappings between vectors in the first dataset to a set of shared universal identifiers are provided to the first party. At block 410, respective mappings between vectors in the second dataset to the set of shared universal identifiers are provided to the second party.

It is contemplated that there can be many other uses, applications, and/or variations associated with the various embodiments of the present technology. For example, in some cases, users can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Figure 5A:
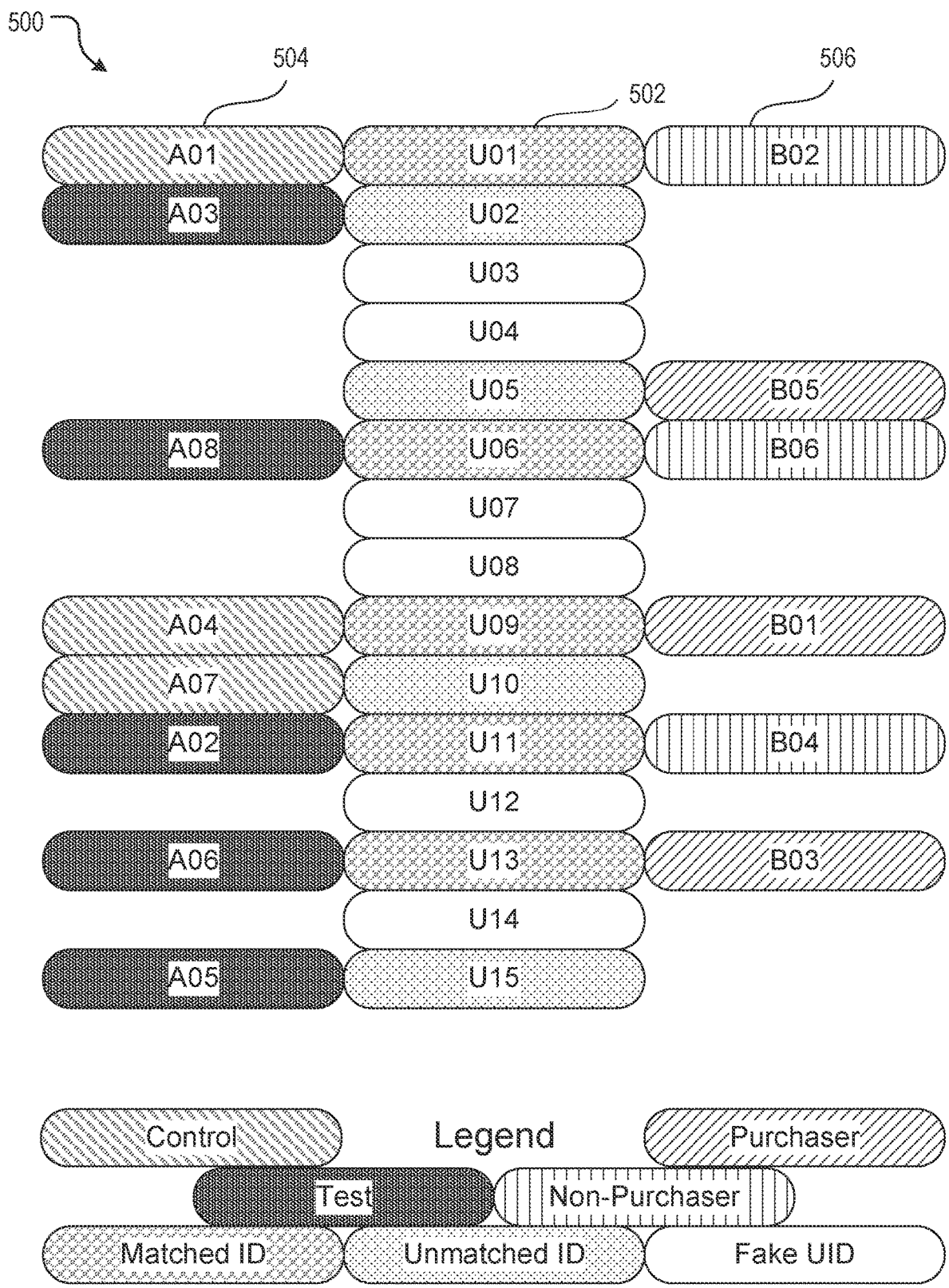
FIGS. 5A-C illustrate examples of a secure lift and reach and frequency analysis for a randomized control trial, according to an embodiment of the present technology.

FIG. 5A illustrates example results 500 of a secure lift analysis for a randomized control trial based on the secure computation module 102 and maximal ID mapping, according to an embodiment of the present technology. For example, a first party, Alice, may be conducting an experiment, such as a randomized control trial. Alice is aware of which users are in a test group, a control group, and who was not included in the experiment. A second party, Bob, can be an outcome observer. For example, Bob can observe which persons make a conversion based on information included in Bob's dataset. For example, Alice may target electronic advertisements to users in the test group through a computing platform that is managed by Bob as part of an advertising campaign. Here, Bob is able to determine whether a given user converted in response to an electronic advertisement. In this example, the secure lift analysis can be performed based on mappings between Alice's data 504 to a set of shared universal identifiers 502 and Bob's data 506 to the set of shared universal identifiers 502, as determined by the mapping module 106. The secure lift analysis can be performed based on the mappings. In various embodiments, the secure lift analysis is performed as a secure multi-party computation. In the example of FIG. 5A, the results 500 can be used to determine a set of values that are responsive to the lift analysis. For example, the set of values can include a count of users that were included in Alice's test group, a count of users that were included in Alice's control group, a count of users in Alice's test group that converted, and a count of users in Alice's control group that converted. The set of values can be provided to Alice who can then evaluate an efficacy of the advertising campaign. Many variations are possible.

Figure 5B:
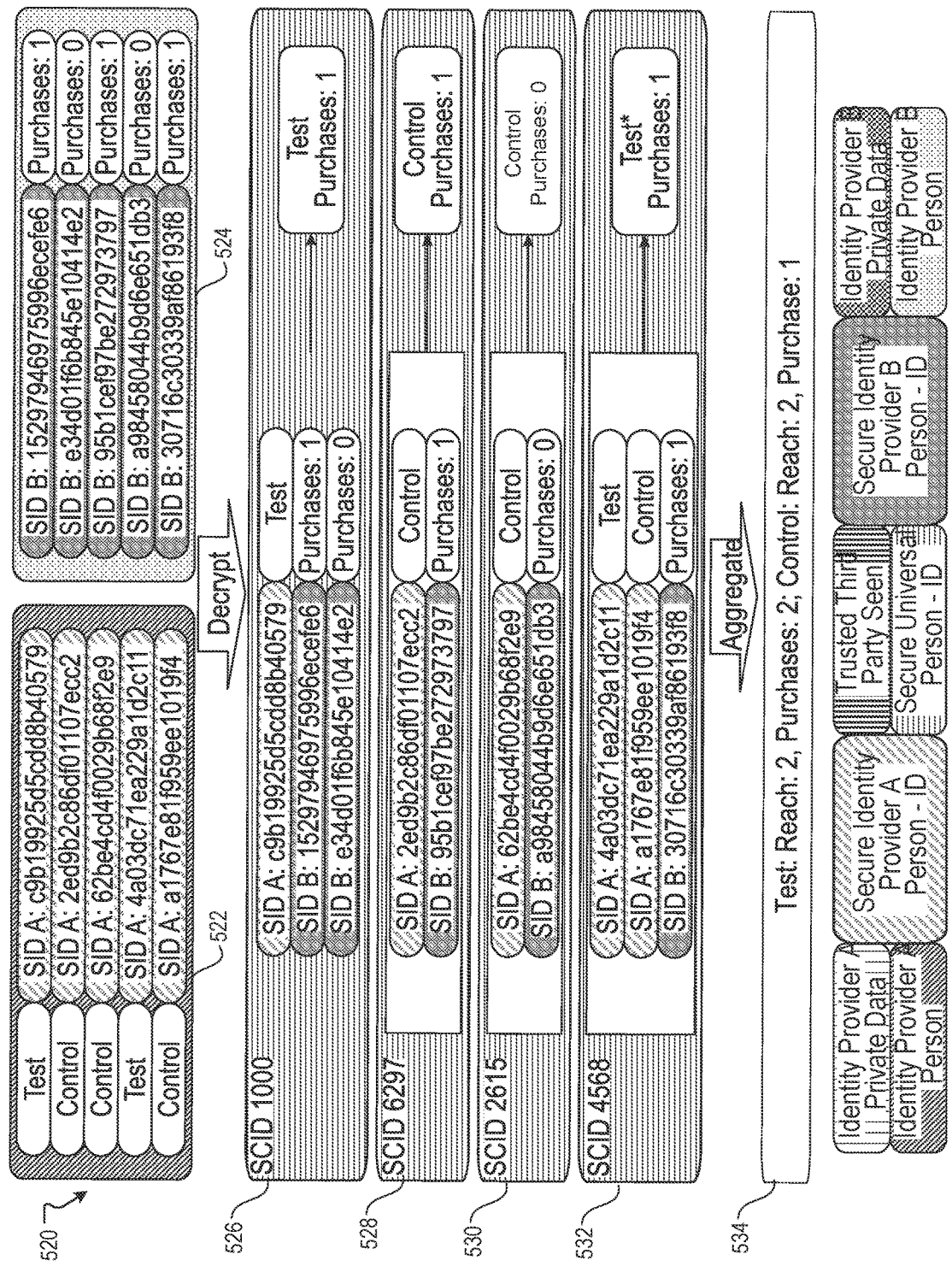

FIG. 5B illustrates example results 520 of a secure lift analysis for a randomized control trial based on the secure computation module 102 and secure identity matching, according to an embodiment of the present technology. For example, a first party, Alice, may be conducting an experiment, such as a randomized control trial. Alice is aware of which users are in a test group, a control group, and who was not included in the experiment. A second party, Bob, can be an outcome observer. For example, Bob can observe which persons make a conversion (e.g., purchase) based on information included in Bob's dataset. For example, Alice may target electronic advertisements to users in the test group through a computing platform that is managed by Bob as part of an advertising campaign. Here, Bob is able to determine whether a given user converted in response to an electronic advertisement. In this example, the secure lift analysis can be performed based on mappings between Alice's data 522 and Bob's data 524, as determined by the secure identity matching module 206. In various embodiments, the secure lift analysis is performed as a secure multi-party computation. In the example of FIG. 5B, a number of Secure Universal Person IDs (SCIDs) can be determined based on the datasets 522 and 524, as described above in reference to the secure identity matching module 206. For example, an "SCID 1000" 526 shows a first Secure Identity Provider ID (SID) A associated with information indicating the SID A was included in a test group, a first SID B associated with information indicating the SID B made one purchase, and a second SID B associated with information indicating the SID B made zero purchases. Each SCID 526, 528, 530, and 532 can be aggregated to determine a set of values 534 that are responsive to the lift analysis. For example, the set of values 534 can include a count of users that were included in Alice's test group, a count of users in Alice's test group that converted, a count of users that were included in Alice's control group, and a count of users in Alice's control group that converted. The set of values 534 may be provided to Alice who can then evaluate an efficacy of the advertising campaign. Many variations are possible.

Figure 5C:
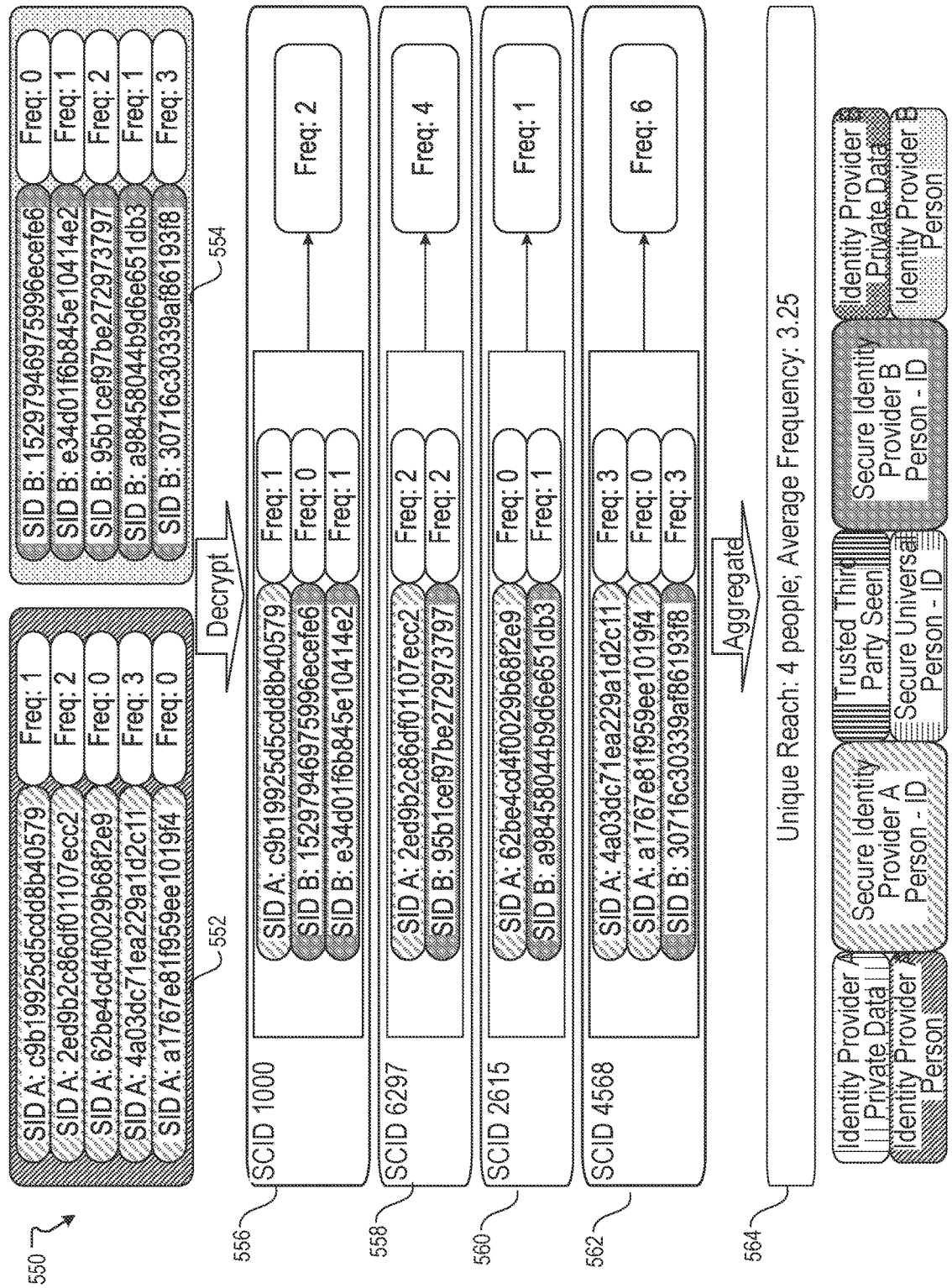

FIG. 5C illustrates example results 550 of a reach and frequency analysis for a randomized control trial based on the secure computation module 102 and secure identity matching, according to an embodiment of the present technology. For example, a first party, Alice, may be collaborating with a second party, Bob, to conduct a reach and frequency analysis. In this example, the reach and frequency analysis can be performed based on mappings between Alice's data 552 and Bob's data 554, as determined by the secure identity matching module 206. In various embodiments, the reach and frequency analysis is performed as a secure multi-party computation. In the example of FIG. 5C, a number of Secure Universal Person IDs (SCIDs) can be determined based on the datasets 552 and 554, as described above in reference to the secure identity matching module 206. For example, an "SCID 1000" 556 shows a first Secure Identity Provider ID (SID) A associated with information indicating the SID A has a frequency of 1, a first SID B associated with information indicating the SID B has a frequency of 0, and a second SID B associated with information indicating the SID B has a frequency of 1. Each SCID 556, 558, 560, and 562 can be aggregated to determine a set of values 564 that are responsive to the reach and frequency analysis. For example, the set of values 564 can include a count of unique users that were reached and an average reach frequency for the users. Many variations are possible.

Figure 6:
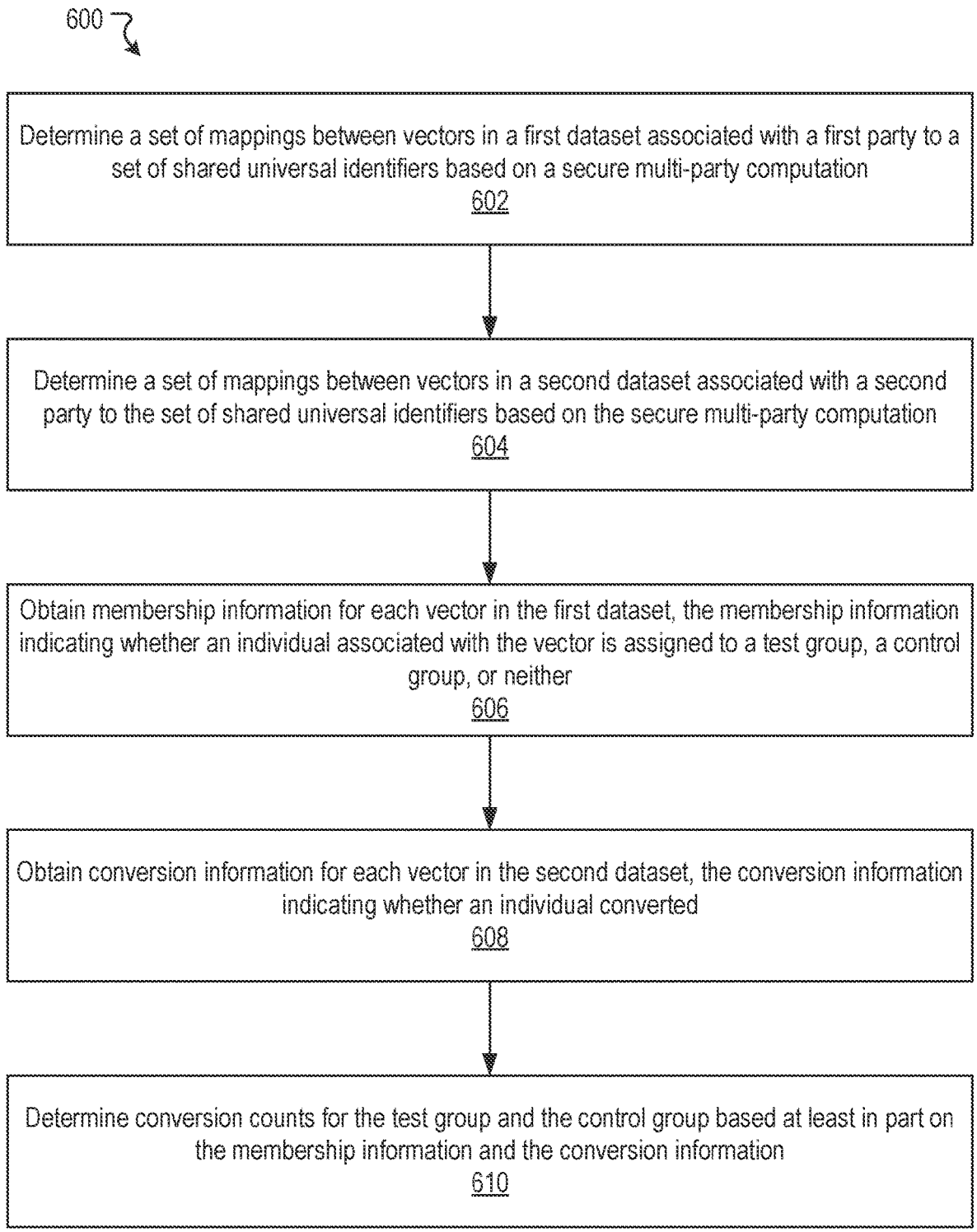
FIG. 6 illustrates an example method for securely performing a lift analysis, according to an embodiment of the present technology.

FIG. 6 illustrates an example method 600 for securely performing a lift analysis, according to an embodiment of the present technology. It should be appreciated that there can be additional, fewer, or alternative steps performed in similar or alternative orders, or in parallel, within the scope of the various embodiments discussed herein unless otherwise stated.

At block 602, a set of mappings can be determined between vectors in a first dataset associated with a first party to a set of shared universal identifiers based on a secure multi-party computation. At block 604, a set of mappings can be determined between vectors in a second dataset associated with a second party to the set of shared universal identifiers based on the secure multi-party computation. At block 606, membership information for each vector in the first dataset can be obtained. The membership information indicating whether an individual associated with the vector is assigned to a test group, a control group, or neither. At block 608, conversion information for each vector in the second dataset can be obtained. The conversion information indicating whether an individual converted. At block 610, conversion counts for the test group and the control group can be determined based at least in part on the membership information and the conversion information.

It is contemplated that there can be many other uses, applications, and/or variations associated with the various embodiments of the present technology. For example, in some cases, users can choose whether or not to opt-in to utilize the disclosed technology. The disclosed technology can also ensure that various privacy settings and preferences are maintained and can prevent private information from being divulged. In another example, various embodiments of the present technology can learn, improve, and/or be refined over time.

Social Networking System—Example Implementation

Figure 7:
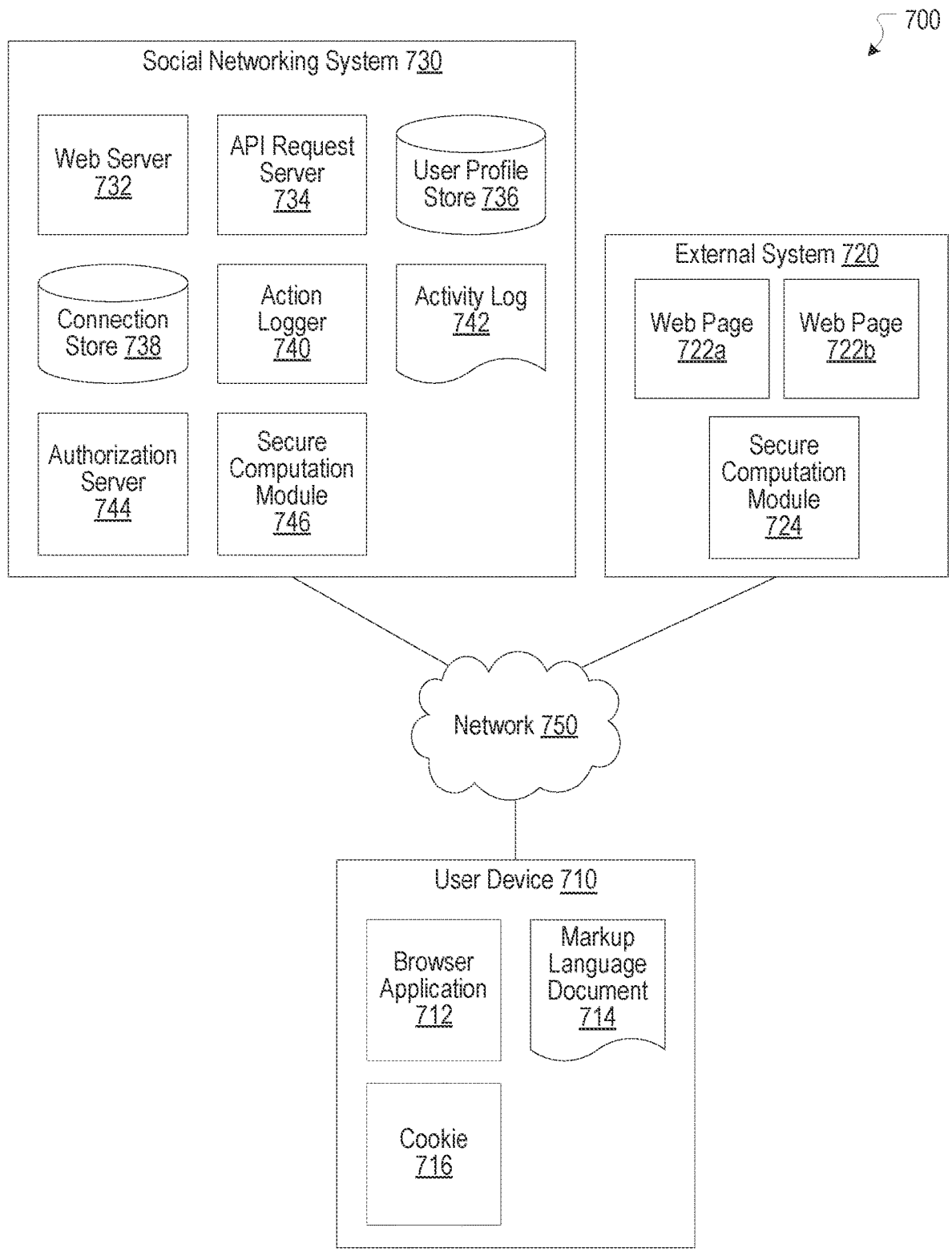
FIG. 7 illustrates a network diagram of an example system including an example social networking system that can be utilized in various scenarios, according to an embodiment of the present technology.

FIG. 7 illustrates a network diagram of an example system 700 that can be utilized in various scenarios, according to an embodiment of the present technology. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a device having computer functionality, such as a smart-phone, a tablet, a personal digital assistant (PDA), a mobile telephone, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750, The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720, In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the social networking system 730 can include a secure computation module 746. The secure computation module 746 can, for example, be implemented as the secure computation module 102. In some embodiments, some or all of the functionalities of the secure computation module 746 can be implemented in the user device 710.

Hardware Implementation

Figure 8:
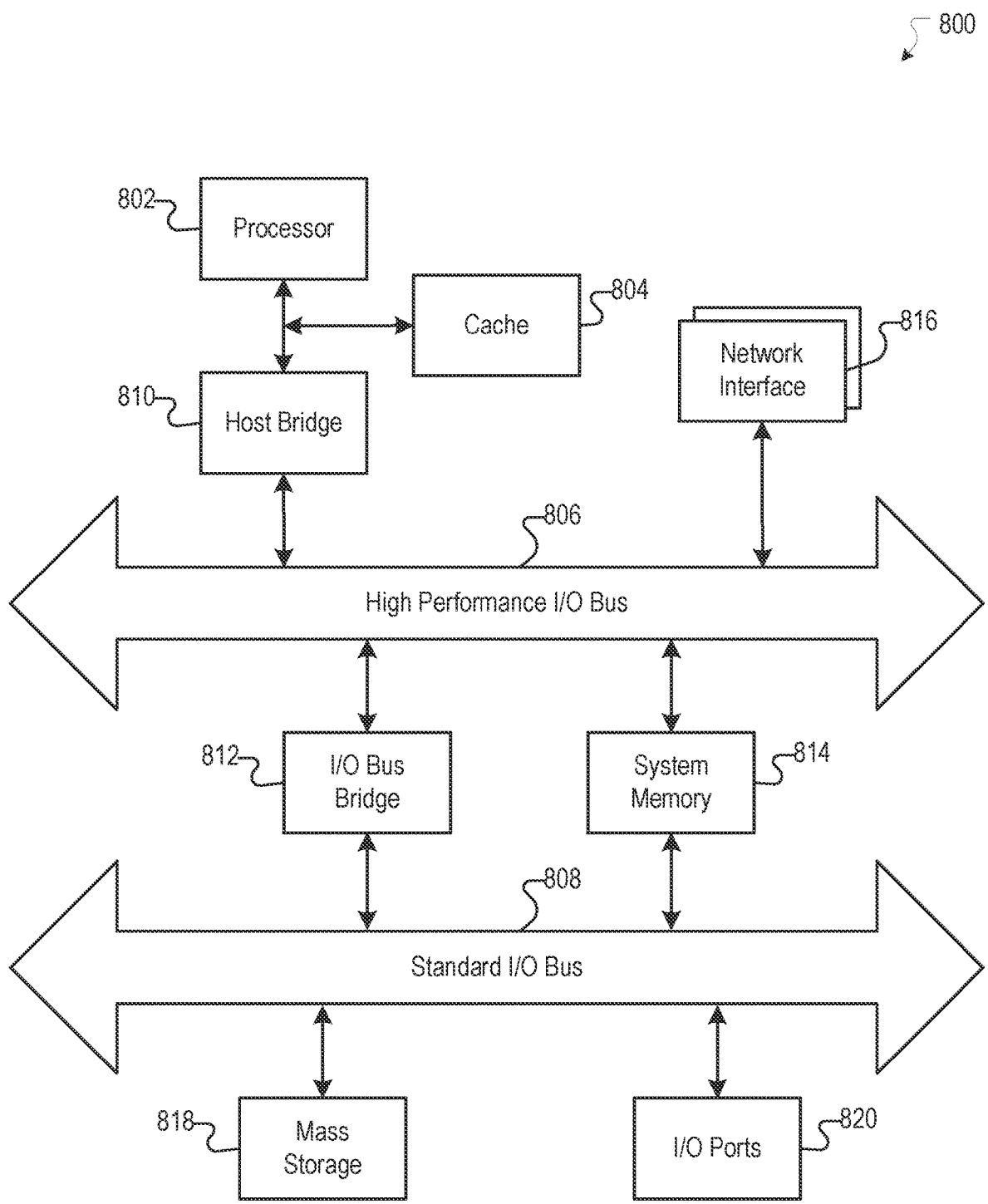
FIG. 8 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 8 illustrates an example of a computer system 800 that may be used to implement one or more of the embodiments described herein according to an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 720, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808, Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown), The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method, comprising:
   determining, by a computing system, a first dataset provided by a first party, wherein the first dataset includes first vectors that are each associated with a first user identifier;
   determining, by the computing system, a second dataset provided by a second party, wherein the second dataset includes second vectors that are each associated with a second user identifier;
   matching, by the computing system, the first vectors in the first dataset to the second vectors in the second dataset based on a secure multi-party computation without revealing respective graph information of the first party or the second party, wherein the matching comprises:
      mapping, by the computing system, the first vectors that are matched to the second vectors to a set of shared universal identifiers;
      mapping, by the computing system, the first vectors that are not matched to the second vectors to first universal identifiers that are not shared with the second party; and
      mapping, by the computing system, the second vectors that are not matched to the first vectors to second universal identifiers, different from the first universal identifiers, that are not shared with the first party;
   performing, by the computing system, a reach analysis as another secure multi-party computation based on (i) respective mappings of the first vectors in the first dataset to the set of shared universal identifiers and the first universal identifiers and (ii) respective mappings of the second vectors in the second dataset to the set of shared universal identifiers and the second universal identifiers; and
   determining, by the computing system, information based on the reach analysis, wherein the information provides at least a count of unique users that were reached between the first user identifiers included in the first dataset and the second user identifiers included in the second dataset.

2. The computer-implemented method of claim 1, wherein the first vectors in the first dataset that match the second vectors in the second dataset are mapped to the same shared universal identifiers.

3. The computer-implemented method of claim 2, wherein the shared universal identifiers correspond to a join-key for joining the first vectors in the first dataset with the second vectors in the second dataset.

4. The computer-implemented method of claim 1, wherein the first vectors in the first dataset that are unmatched are mapped to the first universal identifiers, and wherein the mapping to the first universal identifiers are accessible only to the first party.

5. The computer-implemented method of claim 1, wherein the second vectors in the second dataset that are unmatched are mapped to the second universal identifiers, and wherein the mapping to the second universal identifiers are accessible only to the second party.

6. The computer-implemented method of claim 1, wherein the set of shared universal identifiers includes one or more padding vectors to which none of the first vectors in the first dataset and none of the second vectors in the second dataset are mapped.

7. The computer-implemented method of claim 1, wherein each of the first vectors and each of the second vectors includes a set of attributes corresponding to personally identifiable information.

8. The computer-implemented method of claim 7, wherein an ordering of the set of attributes for the first vectors in the first dataset and the second vectors in the second dataset is pre-defined.

9. The computer-implemented method of claim 8, wherein the first vectors in the first dataset are matched to the second vectors in the second dataset based on the set of attributes corresponding to personally identifiable information.

10. The computer-implemented method of claim 1, wherein the mappings between the first vectors in the first dataset to the set of shared universal identifiers and the mappings between the second vectors in the second dataset to the set of shared universal identifiers are used to perform a lift analysis for a randomized control trial.

11. A system comprising:
    at least one processor; and
    a memory storing instructions that, when executed by the at least one processor, cause the system to perform:
       determining a first dataset provided by a first party, wherein the first dataset includes first vectors that are each associated with a first user identifier;
       determining a second dataset provided by a second party, wherein the second dataset includes second vectors that are each associated with a second user identifier;
       matching the first vectors in the first dataset to the second vectors in the second dataset based on a secure multi-party computation without revealing respective graph information of the first party or the second party, wherein the matching comprises:
          mapping the first vectors that are matched to the second vectors to a set of shared universal identifiers;
          mapping the first vectors that are not matched to the second vectors to first universal identifiers that are not shared with the second party; and mapping the second vectors that are not matched to the first vectors to second universal identifiers, different from the first universal identifiers, that are not shared with the first party;

performing a reach analysis as another secure multi-party computation based on (i) respective mappings of the first vectors in the first dataset to the set of shared universal identifiers and the first universal identifiers and (ii) respective mappings of the second vectors in the second dataset to the set of shared universal identifiers and the second universal identifiers; and determining information based on the reach analysis, wherein the information provides at least a count of unique users that were reached between the first user identifiers included in the first dataset and the second user identifiers included in the second dataset.

12. The system of claim 11, wherein the first vectors in the first dataset that match the second vectors in the second dataset are mapped to the same shared universal identifiers.

13. The system of claim 12, wherein the shared universal identifiers correspond to a join-key for joining the first vectors in the first dataset with the second vectors in the second dataset.

14. The system of claim 11, wherein the first vectors in the first dataset that are unmatched are mapped to the first universal identifiers, and wherein the mapping to the first universal identifiers are accessible only to the first party.

15. The system of claim 11, wherein the second vectors in the second dataset that are unmatched are mapped to the second universal identifiers, and wherein the mapping to the second universal identifiers are accessible only to the second party.

16. A non-transitory computer-readable storage medium including instructions that, when executed by at least one processor of a computing system, cause the computing system to perform a method comprising:

determining a first dataset provided by a first party, wherein the first dataset includes first vectors that are each associated with a first user identifier;

determining a second dataset provided by a second party, wherein the second dataset includes second vectors that are each associated with a second user identifier;

matching the first vectors in the first dataset to the second vectors in the second dataset based on a secure multi-party computation without revealing respective graph information of the first party or the second party, wherein the matching comprises:

mapping, by the computing system, the first vectors that are matched to the second vectors to a set of shared universal identifiers;

mapping, by the computing system, the first vectors that are not matched to the second vectors to first universal identifiers that are not shared with the second party; and mapping, by the computing system, the second vectors that are not matched to the first vectors to second universal identifiers, different from the first universal identifiers, that are not shared with the first party;

performing a reach analysis as another secure multi-party computation based on (i) respective mappings of the first vectors in the first dataset to the set of shared universal identifiers and (ii) respective mappings of the second vectors in the second dataset to the set of shared universal identifiers and the second universal identifiers; and determining information based on the reach analysis, wherein the information provides at least a count of unique users that were reached between the first user identifiers included in the first dataset and the second user identifiers included in the second dataset.

17. The non-transitory computer-readable storage medium of claim 16, wherein the first vectors in the first dataset that match the second vectors in the second dataset are mapped to the same shared universal identifiers.

18. The non-transitory computer-readable storage medium of claim 17, wherein the shared universal identifiers correspond to a join-key for joining the first vectors in the first dataset with the second vectors in the second dataset.

19. The non-transitory computer-readable storage medium of claim 16, wherein the first vectors in the first dataset that are unmatched are mapped to the first universal identifiers, and wherein the mapping to the first universal identifiers are accessible only to the first party.

20. The non-transitory computer-readable storage medium of claim 16, wherein the second vectors in the second dataset that are unmatched are mapped to the second universal identifiers, and wherein the mapping to the second universal identifiers are accessible only to the second party.

* * * * *